United States Patent
Sears et al.

(10) Patent No.: US 6,681,248 B1
(45) Date of Patent: Jan. 20, 2004

(54) METHOD FOR PORT CONNECTIVITY DISCOVERY IN TRANSPARENT HIGH BANDWIDTH NETWORKS

(75) Inventors: William Sears, Lexington, MA (US); Joseph Zahavi, Westford, MA (US); Naimish Patel, North Andover, MA (US)

(73) Assignee: Sycamore Networks, Inc., Chelmsford, MA (US)

( * ) Notice: Subject to any disclaimer, the term of this patent is extended or adjusted under 35 U.S.C. 154(b) by 0 days.

(21) Appl. No.: 09/547,944

(22) Filed: Apr. 12, 2000

(51) Int. Cl.$^7$ .............................................. G06F 15/173
(52) U.S. Cl. ...................................... 709/223; 370/254
(58) Field of Search ................................. 709/223, 224, 709/220, 221; 370/329, 241, 254, 394, 255, 257, 258, 248, 351

(56) References Cited

U.S. PATENT DOCUMENTS

| | | | | |
|---|---|---|---|---|
| 5,084,870 A | * | 1/1992 | Hutchison et al. | 370/258 |
| 5,485,578 A | * | 1/1996 | Sweazey | 709/224 |
| 5,648,965 A | * | 7/1997 | Thadani et al. | 370/241 |
| 5,710,885 A | * | 1/1998 | Bondi | 709/224 |
| 5,715,396 A | * | 2/1998 | Chatwani et al. | 709/242 |
| 5,732,086 A | * | 3/1998 | Liang et al. | 370/410 |
| 5,734,824 A | * | 3/1998 | Choi | 709/224 |
| 5,740,346 A | * | 4/1998 | Wicki et al. | 714/22 |
| 5,845,081 A | * | 12/1998 | Rangarajan et al. | 709/224 |
| 5,850,397 A | * | 12/1998 | Raab et al. | 370/392 |
| 5,974,027 A | * | 10/1999 | Chapman | 370/228 |
| 6,041,049 A | * | 3/2000 | Brady | 370/351 |
| 6,064,647 A | * | 5/2000 | Van Krevelen | 370/228 |
| 6,205,122 B1 | * | 3/2001 | Sharon et al. | 370/254 |
| 6,219,050 B1 | * | 4/2001 | Schaffer | 345/853 |
| 6,314,093 B1 | * | 11/2001 | Mann et al. | 370/351 |
| 6,360,260 B1 | * | 3/2002 | Compliment et al. | 709/224 |
| 6,396,810 B1 | * | 5/2002 | Hebel | 370/248 |
| 6,515,973 B1 | * | 2/2003 | Young | 370/329 |
| 2002/0112060 A1 | * | 8/2002 | Kato | 709/227 |
| 2002/0126625 A1 | * | 9/2002 | Liu et al. | 370/254 |
| 2002/0159437 A1 | * | 10/2002 | Foster et al. | 370/351 |
| 2003/0020976 A1 | * | 1/2003 | Krishnaswamy et al. | 359/110 |

FOREIGN PATENT DOCUMENTS

| | | |
|---|---|---|
| WO | WO 99/50986 | 10/1999 |
| WO | WO 99/57841 | 11/1999 |

OTHER PUBLICATIONS

Network Control and Management of a Reconfigurable WDM Network, John Y. Wei, Chien–Chung Shen, Brian J. Wilson, Michael J. Post; IEEE 1996; pp. 581–586.
A Floating Track Method for Complete Routing; Tadashi Sone and Kiyoshi Nakabayashi; Scripta Technica, Inc. 1986; pp. 20–29.

* cited by examiner

Primary Examiner—Glenton B. Burgess
Assistant Examiner—Kimberly Flynn
(74) Attorney, Agent, or Firm—Weingarten, Schurgin, Gagnebin & Lebovici LLP (57) ABSTRACT

In a network having a trace capability, a method to track the connectivity of the network uses the trace messages. A network manager creates a list of ports in the network and uses that list to track the connectivity. For each port, the manager first checks whether there is a current connection and if it finds one, records the connection. For the unconnected ports, the manager enables the transmission of a trace message that identifies the transmitting port. When a trace detected message is received from a port, the network manager updates the list of ports with the connection just reported and disables the trace message that was detected. A port sending a trace message that is not detected is marked as not connected in the list. The method is useful in high bandwidth circuit-based networks, such as optical networks, composed of links of many types and utilizing differing protocols.

8 Claims, 8 Drawing Sheets

| Port ID | Connected to | Type of Connection | State |
|---|---|---|---|
| 63 | | SONET | |
| 64 | | | |
| 65 | | | |
| 66 | | Ethernet | |
| 67 | | | |
| 68 | | | |

*FIG. 5a*

| Port ID | Connected to | Type of Connection | State |
|---|---|---|---|
| 63 | 68 | SONET | CONNECTED |
| 64 | | ATM | NOT-CONNECTED |
| 65 | | FDDI | NOT-CONNECTED |
| 66 | | Ethernet | CONNECTED |
| 67 | | ATM | NOT-CONNECTED |
| 68 | 63 | SONET | CONNECTED |

*FIG. 5b*

| Port ID | Connected to | Type of Connection | State |
|---|---|---|---|
| 63 | 68 | SONET | CONNECTED |
| 64 | | ATM | NOT-CONNECTED |
| 65 | | FDDI | TRACING |
| 66 | | Ethernet | CONNECTED |
| 67 | | ATM | NOT-CONNECTED |
| 68 | 63 | SONET | CONNECTED |

*FIG. 5c*

| Port ID | Connected to | Type of Connection | State |
|---|---|---|---|
| 63 | 68 | SONET | CONNECTED |
| 64 | | ATM | TRACING |
| 65 | 69 | FDDI | CONNECTED |
| 66 | | Ethernet | CONNECTED |
| 67 | | ATM | NOT-CONNECTED |
| 68 | 63 | SONET | CONNECTED |

*FIG. 5d*

| Port ID | Connected to | Type of Connection | State |
|---|---|---|---|
| 63 | 68 | SONET | CONNECTED |
| 64 | 67 | ATM | CONNECTED |
| 65 | 69 | FDDI | CONNECTED |
| 66 | | Ethernet | CONNECTED |
| 67 | 64 | ATM | CONNECTED |
| 68 | 63 | SONET | CONNECTED |

*FIG. 5e*

| Port ID | Connected to | Type of Connection | State |
|---|---|---|---|
| 63 | 68 | SONET | MONITORED |
| 64 | 67 | ATM | CONNECTED |
| 65 | 69 | FDDI | CONNECTED |
| 66 | | Ethernet | CONNECTED |
| 67 | 64 | ATM | CONNECTED |
| 68 | 63 | SONET | CONNECTED |

| RCVR / XMITTER | RECEIVING DATA | RECEIVING BUT NOT DATA | RECEIVING CARRIER | NOT RECEIVING |
|---|---|---|---|---|
| TRACE | N/A - CONNECTED | TRACING | N/A - CONNECTED | TRACING |
| IDLE | CONNECTED | NOT-CONNECTED | CONNECTED | NOT-CONNECTED |
| SENDING DATA | CONNECTED | ERROR CONDITION | CONNECTED | ERROR CONDITION |

METHOD FOR PORT CONNECTIVITY DISCOVERY IN TRANSPARENT HIGH BANDWIDTH NETWORKS

CROSS REFERENCE TO RELATED APPLICATIONS

N/A

STATEMENT REGARDING FEDERALLY SPONSORED RESEARCH OR DEVELOPMENT

N/A

BACKGROUND OF THE INVENTION

The present invention relates generally to high bandwidth networks and methods used for managing such networks and, more specifically, to optical networks and methods used for discovering the connectivity of networks.

One traditional way of tracking the the connectivity of communication links in a network has been to record the connectivity manually as the node elements and links are installed and activated. Further updates to the network might not be recorded resulting in the record of the circuit-based network becoming obsolete. As packet-based communications became the primary communications protocol to utilize these networks, computer-controlled management of the packets in network was developed and utilized to track packets. However, similar network management methods were not developed for the circuit-based underlying structure of the network. Networks that use a protocol that allows for neighbor and connectivity discovery are termed auto-discovering. Packet-based networks, such as TCP/IP and OSI networks use this technique.

In circuit switched networks, however, connections have traditionally been hand-wired. Circuit based protocols were not designed for auto-discovery. While some capability might be designed into the newer optical connection products, the standards for circuit-based networks are currently not sufficiently developed to allow self-discovery of a general circuit-based network. Recently, data bandwidth requirements have increased and the new types of data (digitized video, massive databases, etc) are too fast to be served by packet-based protocols.

High bandwidth networks require entire circuits, the communication connection between two points, to carry data. The need to understand the topology of the layout of circuits is too critical to rely on the unreliable records of the network generated by yesterday's technology. Therefore, there is a need for a methodology of mapping the circuits present in such networks.

BRIEF SUMMARY OF THE INVENTION

A method of determining the connectivity of a circuit-based network uses the information currently available about the network; its nodes, the ports on the nodes, and the type of the links between ports, to support a technique to discover the remaining connectivity information about the network. A management entity controls the discovery process by enabling transmission of a unique stylized probe message (a TRACE message in the described embodiments) containing transmitter specific information. When a receiver recognizes the message, it reports both the receiver's identity and the transmitter's identity to the management entity. By accumulating this data, the management entity accumulates the connectivity information about the network. Each probe message yields at most one link in the connectivity pattern. The unique stylized probe messages are tailored to the transmission mechanism available at each transmitter. While different types of transmission mechanisms can be used, it is preferable to use the one capable of carrying the most information and disrupting the network least. The management entity that controls the mapping operation can be monolithic, building a map of the entire network in one database, or distributed, allowing maps of subnetworks to reside in multiple nodes hosting management components and one coordinating management resource able to access all the connection information.

BRIEF DESCRIPTION OF THE SEVERAL VIEWS OF THE DRAWING

The invention will be more fully understood by reference to the following detailed description when considered in conjunction with the accompanying drawings, in which.

DETAILED DESCRIPTION OF THE INVENTION

The methods described herein are applicable to high speed switched networks. Examples from an optical implementation will be used to illustrate such methods.

Figure 1:
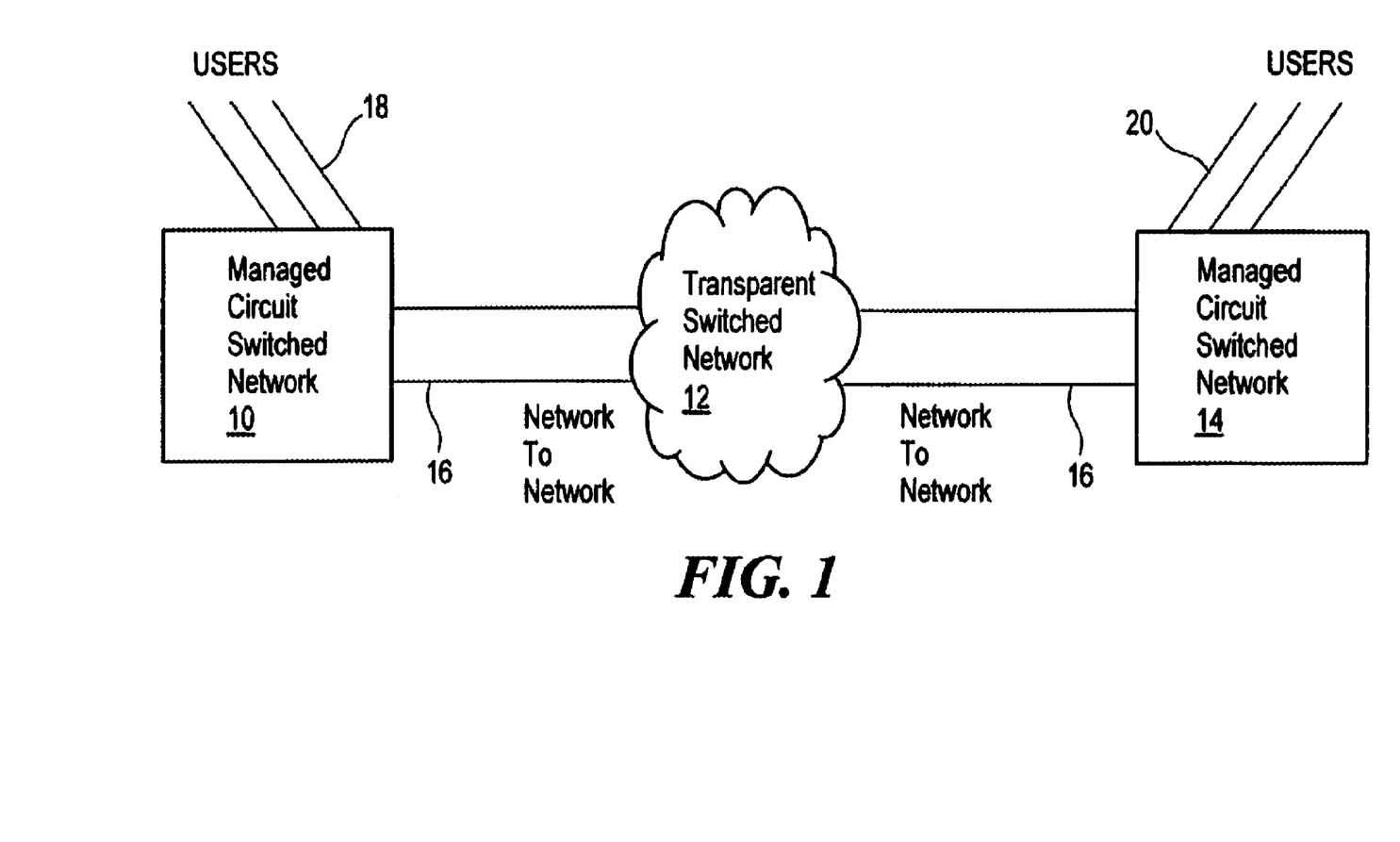
FIG. 1 is a schematic of a network according to the invention.

The network illustrated in FIG. 1 shows two managed circuit based networks 10, 14 that have network-to-network connections traversing a transparent switched network 12. The networks 10 and 14 are connected to respective sets of users via links 18 and 20. The networks 10 and 14 are further connected to the transparent switched network 12 by network to network connections 16.

The managed circuit switched network 10, includes a management entity (not shown) that tracks the state of the network. The state of the network includes information about physical links interconnecting ports, which ports are being used by a program or user, and which ports are not linked to another port. The transparent switched network 12 is not part of the managed switched network 10, so the management entity in managed switched network 10 doesn't know the state of the connections in the transparent switched network 12. If the elements of FIG. 1 are part of a larger managed network, a coordinating management resource (not shown) needs to know the connections that pass through the transparent switched network 12. However, the management entity in the managed switched network 10 generally does not know the connectivity within the transparent network 12, nor where connections 16 terminate in the transparent network 12. Additionally, in transparent networks it is not possible to modify the traffic stream in order to determine connectivity.

Figure 2:
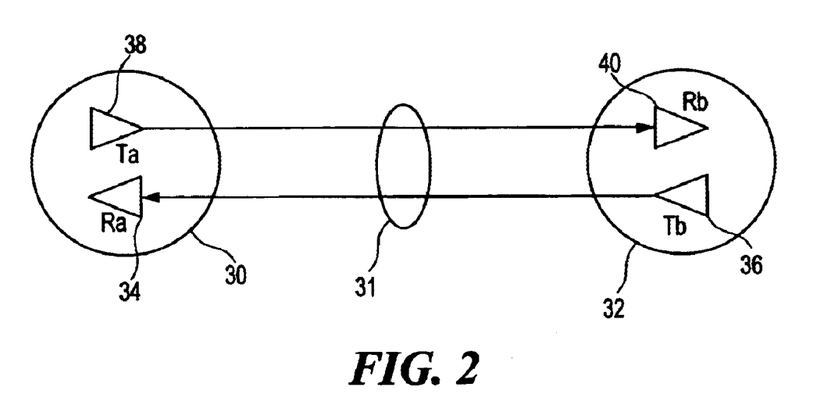
FIG. 2 is a detail of two ports from the network of FIG. 1, and their connection as a circuit.

FIG. 2 shows a detail of two interconnected ports in the network. Bi-directional ports are represented by 30 and 32. The bi-directional port 30 incorporates two sides, a transmitter 38 transmitting information from A to B, and a receiver 34 receiving information transmitted from B to A. The link 31 may consist of one fiber carrying signals in both directions, or a pair of fibers, each carrying one unidirectional signal.

A receiver such as 34 is generally always active. It is monitoring its input. The receiver 34 either receives nothing or it receives information in a form it can interpret. Thus, a receiver connected to a management entity can inform the management entity whether it is connected to an active transmitter. If the transmitter 36 sends a unique message, called a TRACE message, then receiver 34 can detect this message and report it to the management entity.

The mechanism for carrying a TRACE message can be other than a normal information carrying mechanism; it could be a unique frequency, a variation in voltage, or some other pre-arranged mechanism. The TRACE message also carries unique information such as an identifying address which can be passed on to the management entity allowing the management entity to infer the existence of a circuit between the reporting receiver 34 and the transmitter 36 sending the unique message.

The transmitter 36, on the other hand, is passive. It merely transmits a signal presented to it irrespective of the presence of a receiver. The transmitter can send a unique signal, but cannot detect whether it is received nor identify the receiver.

Figure 3:
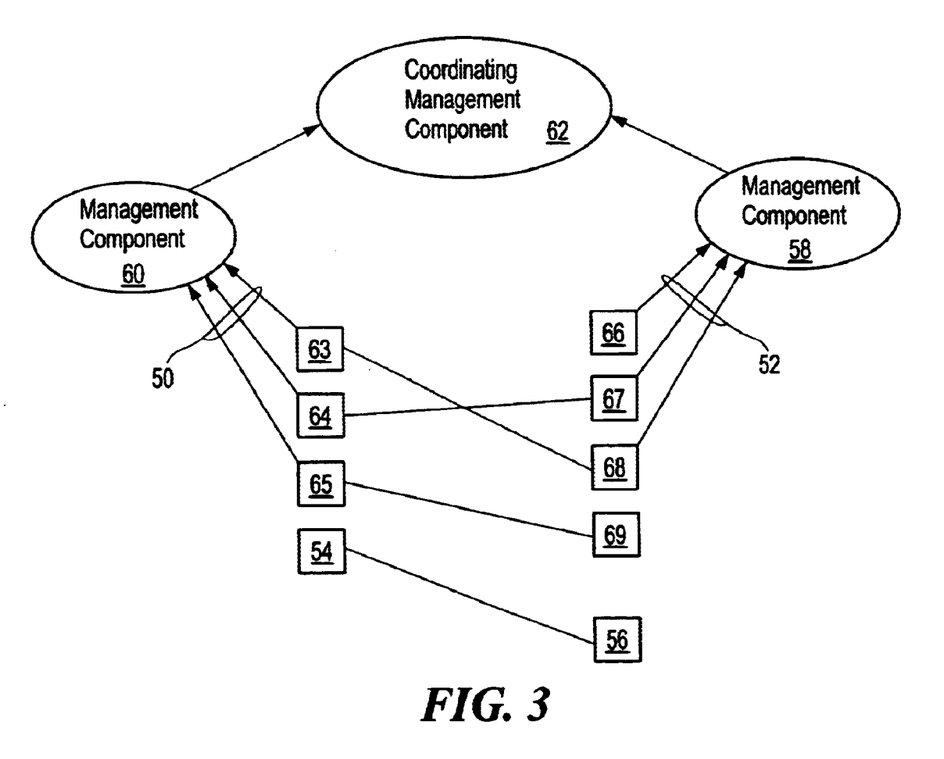
FIG. 3 is a block diagram illustrating participating ports and non-participating ports according to the invention.

FIG. 3 illustrates the communications between ports and management components including coordinating management resources. A first set of ports 63, 64, and 65 report to one management component 60. A second set of ports 66, 67, and 68 report to another management component 58. Because of the connections between ports, management component 60 learns of ports 67 and 68, and management component 58 learns of ports 63 and 64. In addition, management component 60, due to its connection with port 65, learns of port 69, which does not report to any management component. Ports 54 and 56 are connected to each other, but do not participate in the managed network because neither one of them reports to a management entity. The coordinating management component 62 may maintain an overall database of ports in the entire managed network and/or may facilitate the transfer of information between all management resources including ones not shown.

Figure 4:
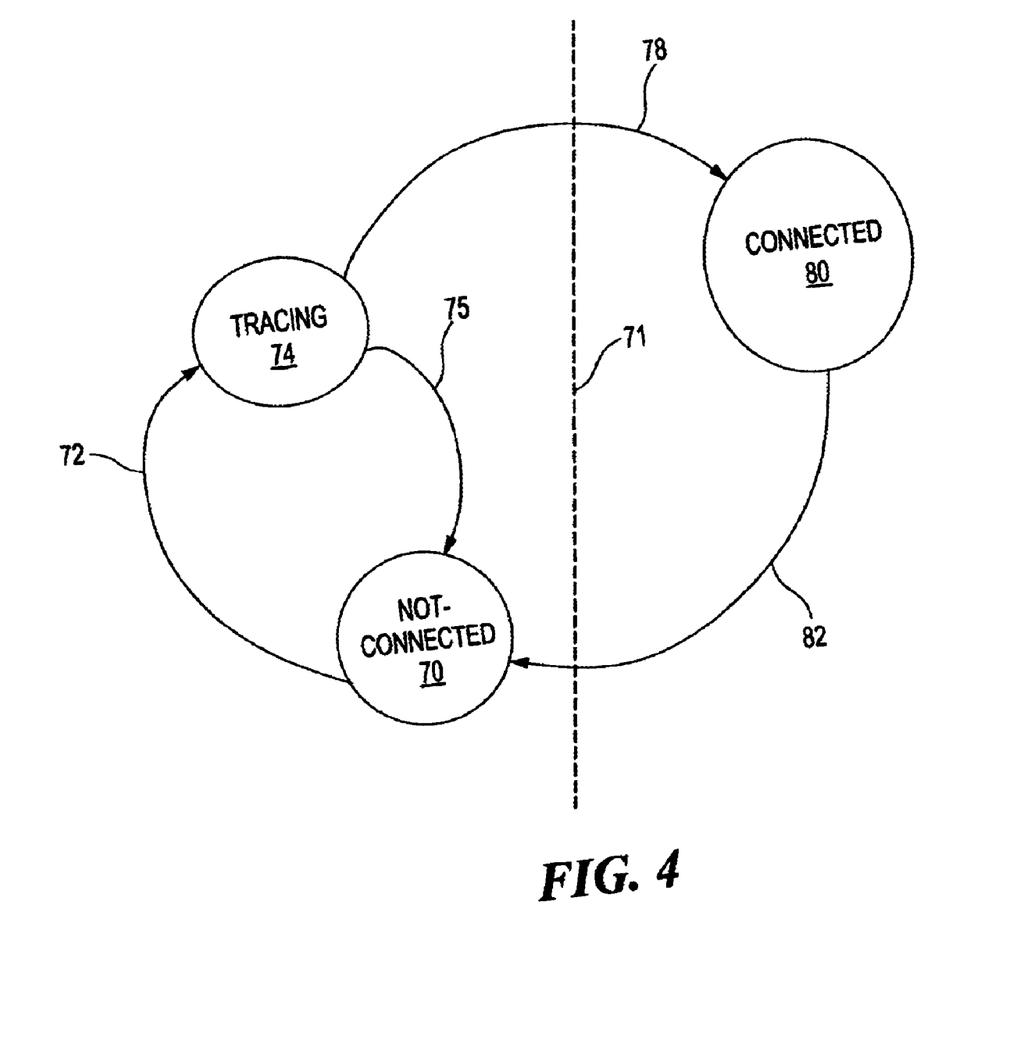
FIG. 4 is a state diagram of a port according to the invention.

The management entity tracks the status of each port using a sequence of states as illustrated in FIG. 4. A port can be either connected to another port or disconnected. Line 71 separates the port state diagram into a connected side containing state 80 and disconnected side containing states 70 and 74. A port starts in state NOT-CONNECTED 70 meaning that the port can report to the management entity but is not transmitting to nor receiving from any other port. A management command 72 moves the port into the TRACING state 74 meaning that the transmitter side of the port is sending a unique message (the TRACE message) that, if received and reported to the management entity by a managed receiver, allows the management entity to infer a link between the two ports. The port remains in the TRACING state 74 until the port's TRACE message has been received by a receiver whereupon a management command 78 moves the port into the CONNECTED state 80. When the port is in CONNECTED state 80, it is available for use by communications applications programs. If the port's TRACE message is not reported as received within a predetermined time, the management entity sends a command 75 that causes the port to transition from the TRACING state 74 to the NOT-CONNECTED state 70. When a port has entered the CONNECTED state 80, it remains in the CONNECTED state 80 until the connection to its counterpart is lost. When the management entity is informed of the lost connection, it sends a command 82 that moves the port to the NOT-CONNECTED state 70.

The management entity tracks port connectivity and tracing activity using a port list such as illustrated in FIG. 5, which shows a port list in the Coordinating Management Component 62 of FIG. 3. FIG. 5a illustrates an initial state of the list, for example upon power-up of the management unit or power-up of the entire network. The management entity knows of a number of ports by their ID, and for some of those ports knows the physical layer protocol or physical connection type. For instance in FIG. 5a, Port 63 is known to use the SONET protocol and Port 66 to use Ethernet. Techniques to determine the type of connection are well known in the art. It is assumed that appropriate techniques are used to determine the connection types for the remaining ports, and these values are then entered in the port list as shown in FIG. 5b.

In an alternate embodiment, if the management entity has a record of the interconnection of ports in the network from some source, such as manual records, the management entity could provisionally fill in the "Connected to" column of the list. These initial connections would be subject to verification by the TRACE mechanism, but would provide connection information for unmanaged ports. The verification would update the manual records for broken links, unrecorded upgrades or faulty equipment.

Figure 5A:
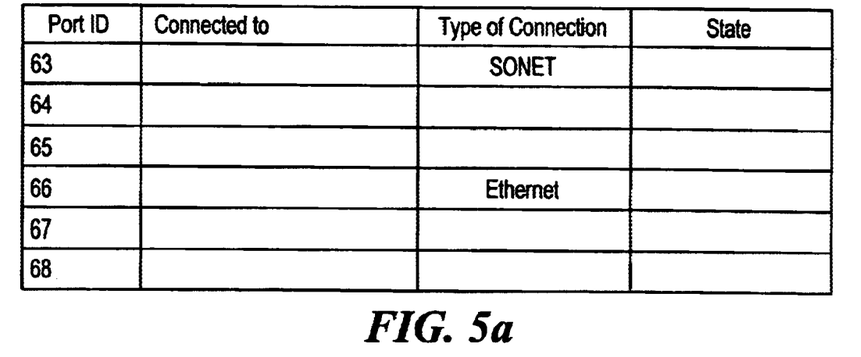
FIG. 5 is a representative list maintained by a management component in the network of FIG. 1, of its ports, their connections and states.
Figure 5B:
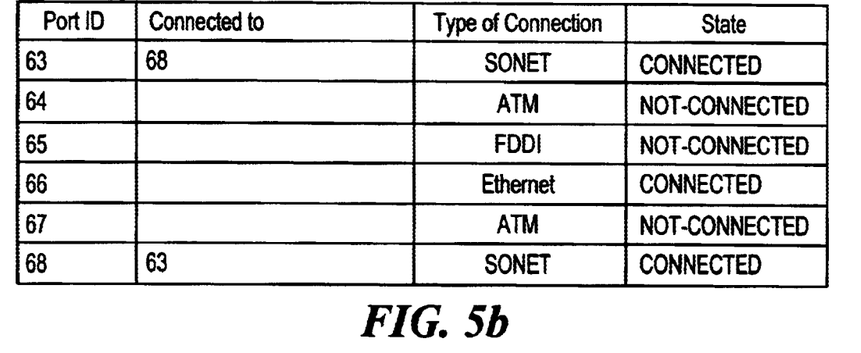
Figure 5C:
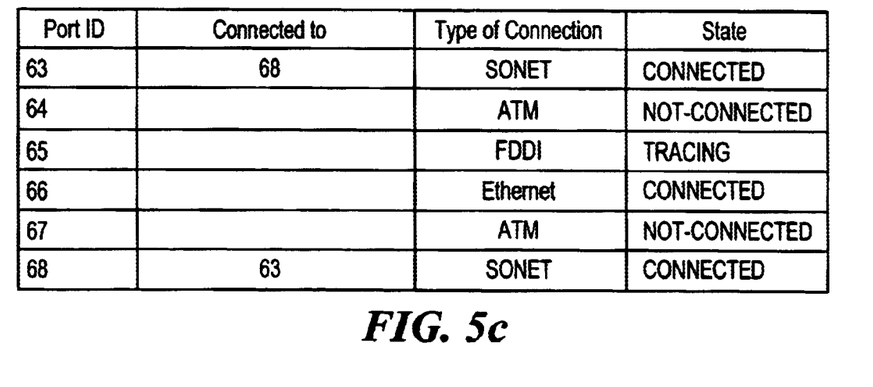
Figure 5D:
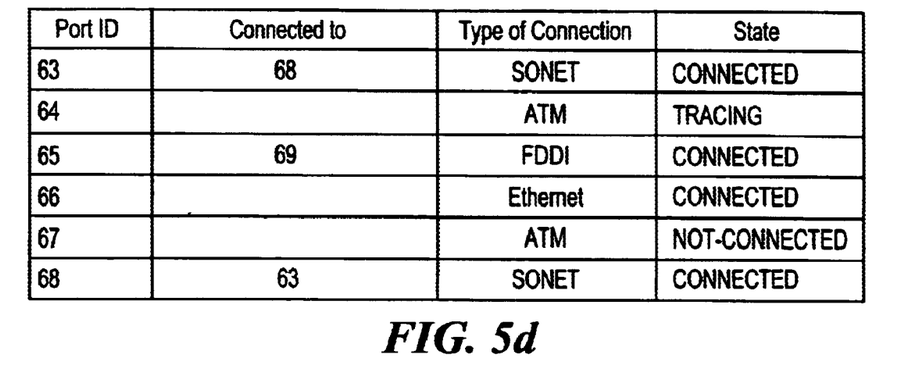
Figure 5E:
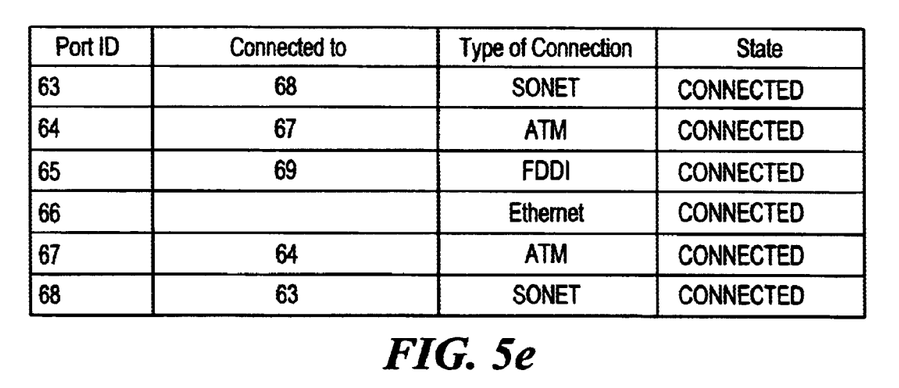
Figure 5F:
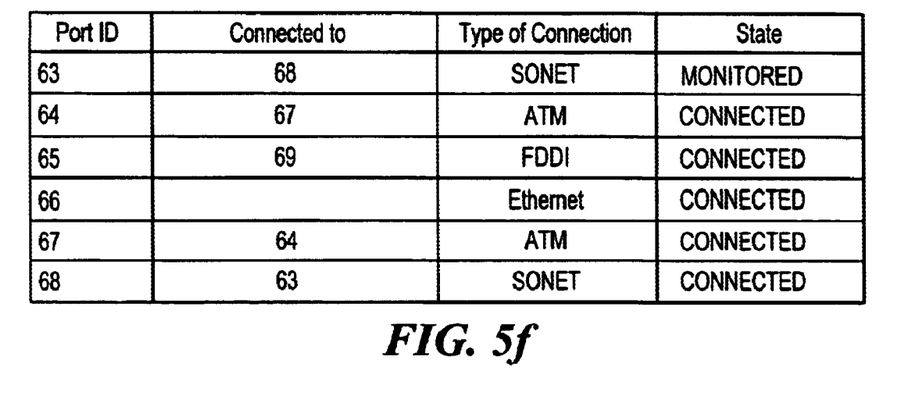
Figure 6:
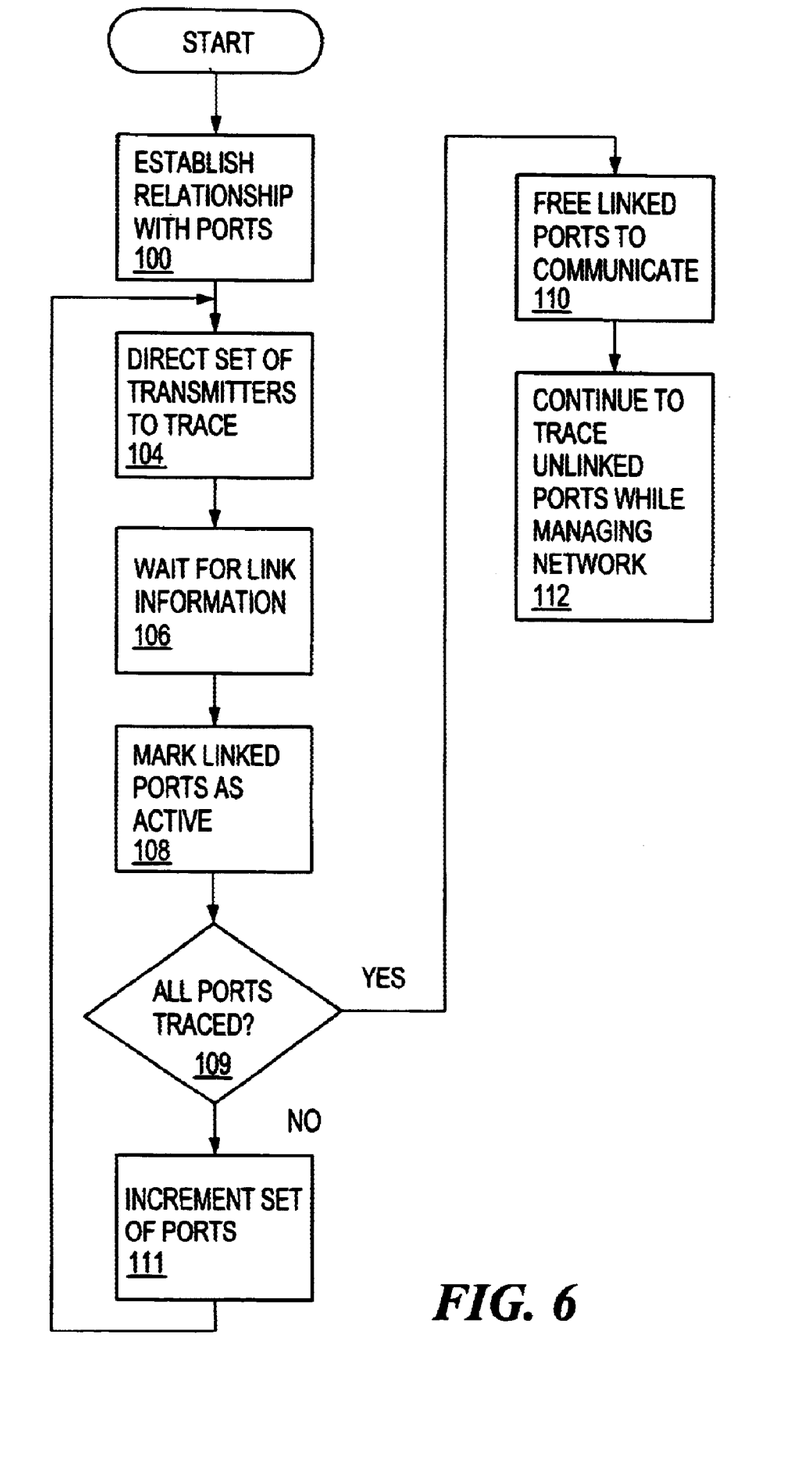
FIG. 6 is a flow diagram of the operation of a management entity discovering the connectivity of the network of FIG. 3.

In an embodiment of the invention, initialization of the management port list of FIG. 5 and the network is tracked as shown in FIGS. 5a through 5d and takes the form of the steps in the flowchart of FIG. 6. The management entity first establishes a reporting relationship with each port that it will be managing and receives status from each port, step 100. At the end of this operation, the port list has been updated as shown in FIG. 5b, in which ports 63 and 68 are shown as connected to ports 68 and 63 respectively and port 66 is shown as connected, but to an unknown port. Port 66 could be, for instance, connected to a user device.

Connectivity is then discovered using a path tracing technique that employs TRACE messages as mentioned above. A TRACE message is a unique message, distinguishable from a regular transmission, which carries information that can be interpreted by some receivers and reported back to a management entity. The report from the receiver allows the management entity to discover the link between the receiver and the transmitter that is sending the TRACE message.

As previously mentioned, the TRACE message may be carried over a link using any of a variety of TRACE mechanisms. The TRACE mechanisms may be stored in a database or a list and the "type of connection" entry in the port list of FIG. 5 provides a pointer for the management entity as to what type of TRACE mechanism to use. For example, a SONET link TRACE message could be sent using a pattern in the J0 (section trace) bytes. A Gigabit Ethernet link TRACE message could be sent using a standard packet or could use unused codewords of the 8B/10B code. For a transparent link capable of low frequency modulation and detection a TRACE message could be sent by varying the voltage of the signal. A TCP/IP or OSI link TRACE message could be sent using the self discovery capabilities built into the protocol. For a link where the signal can be turned on and off, and where the presence of a signal can be detected, a TRACE message could be sent by turning power on and off in a Morse Code like pattern. For a link capable of handling a subcarrier, such as one using some analog component before signal detection, a TRACE message could be sent by placing signals on a sub carrier. Finally, for a link where information is encoded into forward error correction frames, a TRACE message could be sent using Forward Error Correction Frames. This technique can be extended to any link where information is encoded into frames, and at least some of the bits are available when the frames are not carrying traffic. For some types of connection, multiple TRACE mechanisms could be possible, with the success of a particular mechanism dependent on the higher level protocols being used on the link. As an alternate embodiment, multiple parallel TRACE mechanisms may be initiated at one port, with the mechanism that successfully detects the connection being utilized for further TRACEs. As standards are developed in the optical networking realm, the management entity will be able to use the least intrusive and most informative standard supported by the link.

The TRACE message includes a TRACE signature to distinguish the TRACE message from another transmission, an identification of the transmitter port to allow the management entity to identify both ends of the link, and an identification of the management entity that needs to know the transmitter and receiver that define the link. The TRACE signature can be an unlikely constant value or some function of the rest of the data in the message. A type of checksum is one such function. The checksum can be further encoded by adding in a unique value to a message-computed checksum. A separate management component, such as the receiver's management component, may receive the initial TRACE report from the receiver, but that information will be passed through the distributed management to the identified management entity.

Referring to the flow diagram of FIG. 6, after the first contact with the ports is accomplished in step 100, the management entity directs a set of transmitters to send unique TRACE messages into the network, step 104. In a preferred embodiment, groups of transmitters source TRACE messages simultaneously, although for an initial setup situation, all disconnected ports could TRACE simultaneously. The management port list is further updated to the state of FIG. 5c, where port 65 is shown as TRACING. The management entity waits a predefined time for reports from receivers, step 106. Each time a report (referred to as a TRACE detected message) is received, the management port list is updated and the TRACE message(s) for that link are terminated, step 108. One report may cause termination of two TRACE messages, the TRACE message that caused the report by the receiving port and any TRACE message currently being sent by the transmitting side of the receiving port.

In a preferred embodiment, as a failsafe mechanism in case the management entity does not respond in a timely manner, the receiver of a port that has recognized a TRACE message terminates any TRACE message being sent by its own transmitter.

Once the predefined time has elapsed, an additional set of transmitters is directed to send TRACE messages, step 104 as shown in FIG. 5d, until all initially NOT-CONNECTED transmitters known to the management entity have been in the TRACING state. Once all disconnected ports have undergone a TRACE, the linked ports are freed to communicate in Step 110 by making the ports available to a communications program. Alternatively, linked ports are freed to communicate as soon as the management entity is sure that any TRACING of the line has been terminated. The management entity continues TRACING disconnected ports, step 112, according to a predetermined algorithm such as a round robin, while managing other aspects of the network. When all ports known to the management entity are connected, the management port list will look like FIG. 5e.

The management entity can serve functions other than the TRACING function. For example, for Ethernet links, the management entity can supply a port with its counterpart's IP address at the time the physical address of the link is reported.

The management entity presumes that links remain connected unless a communications program reports a disconnect. When a disconnect between two ports is reported, the management port list is updated to show that the ports are now NOT-CONNECTED, and a TRACE of that link is scheduled according to the predetermined algorithm.

Figure 7:
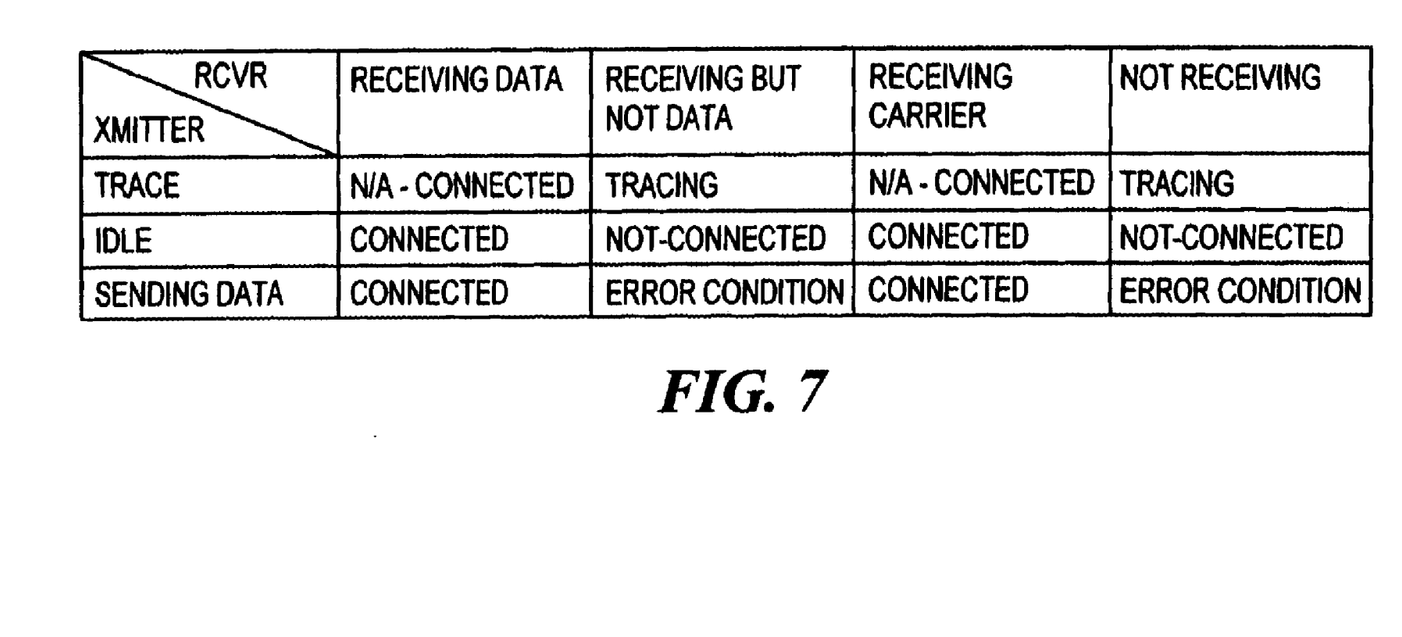
FIG. 7 is a matrix showing the possible input/output characteristics of each side of a port of FIG. 2 and the state that corresponds with each.

An alternate way of viewing the state of a port is by the actions being performed by the two sides of the port as shown in FIG. 7. If the receiver is receiving data as shown in column 2 of FIG. 7, the port is in the CONNECTED state 80 regardless of what the transmitter is doing. The transmitter is not allowed to be sending a TRACE when its receiver is receiving. Similarly, if the receiver is receiving a valid carrier as shown in column 4 of FIG. 7, the port is in the CONNECTED state 80 and the transmitter is not allowed send a TRACE message. If the receiver has nothing on its input as shown in column 5 of FIG. 7, the port is disconnected. When the transmitter is TRACING while the receiver has nothing on its input, the port is in the TRACING state 74. If the transmitter is idle, the port is in the NOT-CONNECTED state 70. If the transmitter is sending data while the receiver has nothing on its input, the port is disconnected, but there is an error condition—likely a false positive on the transmitter. Similarly, if the receiver is receiving something other than data or a valid carrier as shown in column 3 of FIG. 7, the port is disconnected and can be in either the NOT-CONNECTED state 70 or TRACING state 74.

The method of using TRACE messages to discover connectivity can be extended to monitoring an active network. In this mode, the management entity uses an algorithm to choose which circuits to monitor. This algorithm can be based on a variety of information sources available to the management entity, such as user configuration, traffic type, incidence of false positive connections, and length of connection. The management port list is updated as shown in FIG. 5f to indicate that a port is being MONITORED. The TRACE message used for monitoring is a low-information-rate trace sent using a mechanism that is known not to be disruptive to the particular circuit. For example, information could be sent via the section trace byte in a SONET message by occasionally changing the byte.

Figure 8:
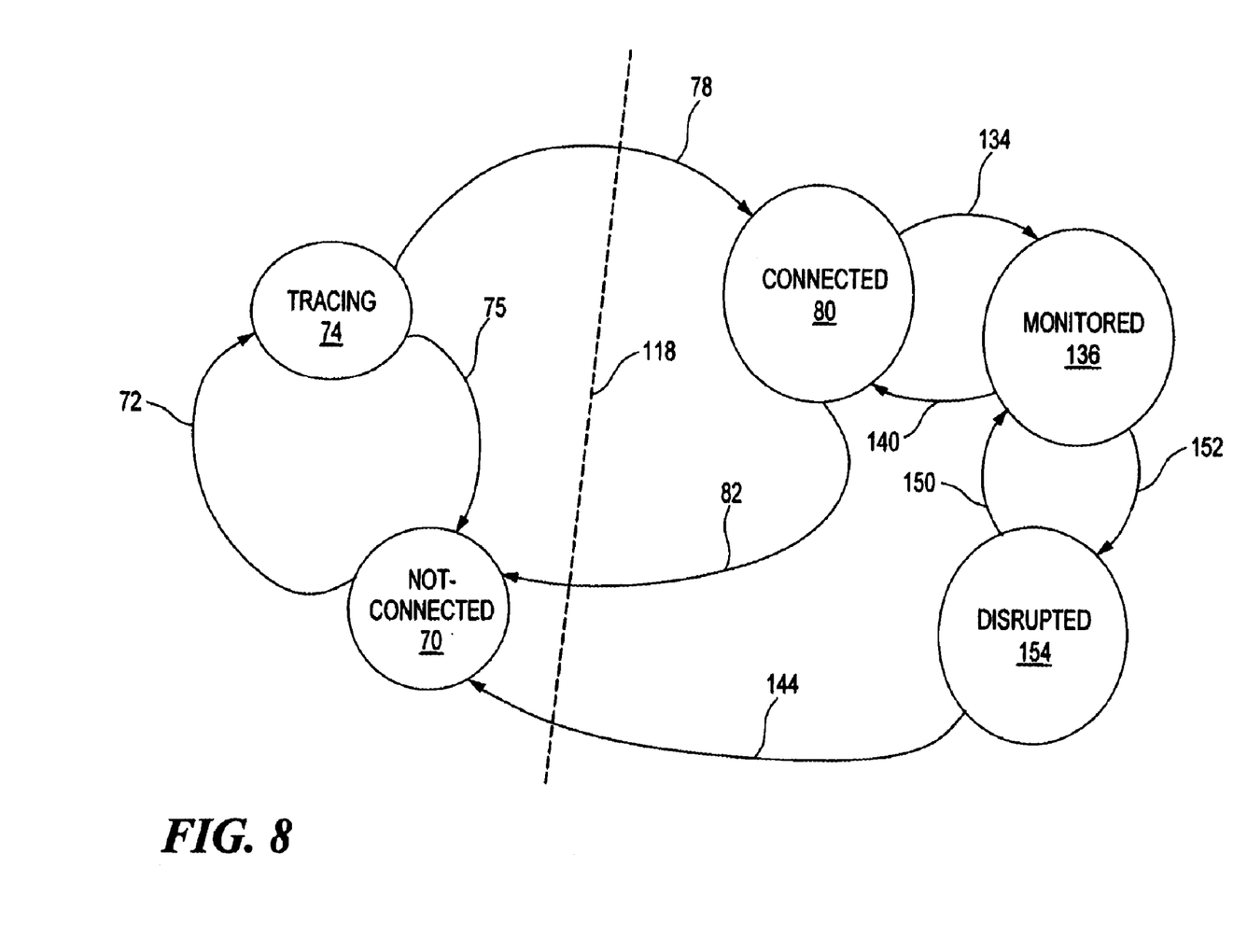
FIG. 8 is a state diagram of a managed port according to the invention.

The sequence of states employed for active monitoring is illustrated in the state diagram of FIG. 8. Line 118 separates the port state diagram into a connected side containing states 80, 136 and 154 and a disconnected side containing states 70 and 74. The disconnected side of the FIG. 8 is the same as illustrated in FIG. 4, while the connected side adds the MONITORED state 136 and the DISRUPTED state 154. When a connection to a port in the CONNECTED state 80 is lost, a management command 82 places the port in the NOT-CONNECTED state 70. If the CONNECTED port is to be monitored, a management command 134 puts the port into the MONITORED state 136 where monitoring traces are sent to the port by its counterpart. The port normally stays in the MONITORED state 136 until returned to the CONNECTED state 80 by a management command 140. If a disruption in the monitoring is detected, the port being MONITORED reports this to the management entity which issues a command 152 placing the port in the DISRUPTED state 154. If the disruption is cleared quickly enough, a later management command 150 will return the port to the MONITORED state 136. If the disruption is not cleared quickly, a management command 144 places the port in the NOT-CONNECTED state 70.

Preferred embodiments of the invention having been described, it will be apparent to those skilled in the art that other embodiments incorporating these concepts may be used. Accordingly, it is submitted that the invention should not be limited by the described embodiments but rather should only be limited by the spirit and scope of the appended claims.

What is claimed is:

1. A method of determining connectivity in circuit-based networks including a plurality of nodes having a plurality of ports connected by links, each port having a transmit side and a receive side, the method being executed by a management entity in the network, the management entity being a distributed manager having a plurality of management resources, each management resource having a port/link table for ports of network nodes associated with the management resource, the method comprising:

for a first port that is not receiving user data from any other port, enabling a trace message from the transmit side of the first port;

monitoring for a trace detected message from a second port; and on receipt of the trace detected message, recording the existence of a link between the first port and the second port, wherein the second port reports the trace detected message to the distributed manager via the management resource associated with the second port.

2. A method of determining connectivity in circuit-based networks made up of a plurality of nodes having a plurality of ports connected by links, each port having a transmit side and a receive side, the method being executed by a management entity in the network, the management entity maintaining a port/link table for ports of network nodes wherein each port/link table entry has associated with it a type of connection, the method comprising:

for a first port that is not receiving user data from any other port, enabling a trace message from the transmit side of the first port;

monitoring for a trace detected message from a second port; and on receipt of the trace detected message, recording the existence of a link between the first port and the second port, wherein the management entity has a database of different trace mechanisms, each mechanism to be selected based on the type of connection.

3. The method of claim 2 wherein the trace message is encoded by powering a carrier signal on and off at a low rate.

4. The method of claim 2 wherein the trace message is encoded as a signal on a sub-carrier frequency that is compatible with the connection on the link.

5. The method of claim 2 wherein the trace message is encoded as a special packet type.

6. The method of claim 2 wherein the trace message is encoded in forward error correction frames at system startup.

7. A method of determining connectivity in circuit-based networks made up of a plurality of nodes having a plurality of ports connected by links, each port having a transmit side and a receive side, the method comprising:

for a first port that is not receiving user data from any other port, enabling a trace message from the transmit side of the first port;

monitoring for a trace detected message from a second port; and on receipt of the trace detected message, recording the existence of a link between the first port and the second port, wherein the trace message includes a management address, a trace signature and a port identifier.

8. A method of determining connectivity in circuit-based networks made up of a plurality of nodes having a plurality of ports connected by links, each port having a transmit side and a receive side, the method comprising:

for a first port that is not receiving user data from any other port, enabling a trace message from the transmit side of the first port;

monitoring for a trace detected message from a second port; and on receipt of the trace detected message, recording the existence of a link between the first port and the second port, wherein the second port disables a trace message from the transmit side of the second port upon receiving the trace message.

* * * * *